Patented Mar. 20, 1934

1,951,976

UNITED STATES PATENT OFFICE 1,951,976

PROCESS FOR PRODUCING ALLOYED IRON AND STEEL

Ture Robert Haglund, Stockholm, Sweden

No Drawing. Application November 12, 1927, Serial No. 232,946. In Sweden February 9, 1927

2 Claims. (Cl. 75—22.5)

This invention relates to such processes for producing alloyed iron or steel in which the iron wholly or partly is reduced out of iron oxide and the alloy components are added in the form of rich chromium alloys. By iron oxide, in the specification and claims, is meant not only $Fe_2O_3$ but any oxide of iron as well as iron ores etc.

This invention is mainly characterized by the addition of chromium alloys in surplus, said surplus serving as reducing agent for the iron oxide under formation of a considerable quantity of a slag rich in oxide of chromium. By choosing raw material with a low percentage of other slag-forming ingredients the process is conveniently regulated so that the slag obtains such a high percentage of oxides of chromium that the same will be a very valuable raw material for producing rich chromium alloys. The iron oxide, iron ore or the like, would therefore be rather rich but especially poor in silica. Dressed ore concentrates may be used with advantage, and they may before use be transformed into lumps by sintering or briquetting in known ways. The chromium alloy should also be poor in silicon. If the raw material is selected with special care, by using chromium alloy added in surplus as the only reducing agent, a slag can be obtained in this process, that contains only a few percent of silica and with a total percentage of oxide of iron and chromium even surpassing 90%, i. e. a far more valuable raw material than the present commercial chromium ores.

According to one form of the invention a carbonaceous material, such as charcoal, coke or anthracite, is used together with the chromium alloy as reducing agent for iron oxide. A part of the iron may also be added in a metallic state, for instance in a molten state or as chips.

Other alloy components than chromium may also be admitted. One may for instance admit nickel by adding nickel either in the metallic state or as oxide that will be reduced in the process.

The present process can be carried out both in common electric steel furnaces as well as in electric reduction furnaces of the type usually used when producing iron alloys, carbides and the like by reduction of oxides. Ordinarily the furnace bottom should be made of other material than carbon, for instance of magnesite of chromite, and should preferably be well cooled from below.

The charge is with advantage smelted discontinually, the charge being admitted in portions. The ingredients of the charge shall be intimately mixed in a finely-divided state and formed into briquettes or the like.

According to the present process iron and steel alloyed with a high percentage of other metals can be produced with advantage, for example holding 20–30% chromium or thereabove, nickel-chromium-steel, so-called rustless iron and steel with about 10–15% chromium, and also alloys containing down to one or a few percent of chromium.

*Example.*—Composition of charge by production of chromium steel with about 15% Cr.

Briquettes containing 1150 kg. iron ore concentrate, 400 kg. ferro-chromium, 120 kg. charcoal and binding agent.

Charcoal in lumps—150 kg.

Above materials are mixed and charged in an electric furnace for fusing, whereby one part of the chromium, corresponding to the 15% desired in the end product, enters in the alloyed steel. The reduction takes place partly by means of the carbon and partly by means of the other part of the chromium, which hereby is oxidized and together with other slag-forming ingredients goes into a high chromium oxide slag. The molten products are further treated for refining, and the furnace is thereupon tapped. The resulting products are the alloyed steel and a valuable slag, with a content of oxide of chromium even more than in commercial chromium ores.

The relation between the quantity of chromium that is oxidized and the quantity that will be alloyed with the iron or steel can be varied within wide limits. The quantity of chromium that is oxidized should, however, as a rule amount to such a considerable part, for instance one-third or more, of the total quantity of added chromium, so that a quantity of chromium slag necessary for refining is formed.

By rich chromium alloys is here meant alloys with considerable higher percentage of chromium than there is present in the produced alloyed iron or steel. Thus the common commercial ferrochromium alloys with about 60—70% chromium may be used. However, in many cases a higher percentage of iron than usually present in such commercial alloys may be permitted.

I claim:—

1. Process of producing chromium alloyed iron or steel while reducing iron-oxide by means of chromium of a chromium alloy and forming a slag with a substantial proportion of chromium oxide, a part of the chromium entering as a constituent of the reduced iron or steel comprising preparing briquettes containing finely subdivided iron-oxide material and ferrochromium and fusing such briquettes.

2. Process of producing chromium alloyed iron or steel while reducing iron-oxide by means of chromium of a chromium alloy and forming a slag with a substantial proportion of chromium-oxide comprising fusing iron-oxide together with such amounts of carbonaceous material and an alloy rich in chromium, that a chromium alloyed iron or steel containing higher carbon than desired is obtained and decarburizing the alloyed iron or steel by strongly heating the slag.

TURE ROBERT HAGLUND.